Dec. 16, 1969     H. C. HERP, JR     3,484,215

AMMONIA CONVERTER

Filed Aug. 4, 1964

INVENTOR.
HENRY CARL HERP, JR.,

BY *Yungblut, Melville,*
*Strauss & Foster,*

ATTORNEYS.

3,484,215
AMMONIA CONVERTER
Henry Carl Herp, Jr., Louisville, Ky., assignor to Girdler Corporation, Louisville, Ky., a corporation of Ohio
Filed Aug. 4, 1964, Ser. No. 387,364
Int. Cl. B01j 9/00
U.S. Cl. 23—289                                    7 Claims

ABSTRACT OF THE DISCLOSURE

A converter for the synthesis of ammonia and the like comprising an elongated pressure vessel with an entrance means at one end for process gases and an exit means at the other end for product gases. The vessel contains in sequence a heating means, a catalyst basket and a heat exchanger, the heat exchanger and the catalyst basket each having a plurality of heat exchange tubes extending the length thereof. A first and a second chamber located between the heat exchanger and the catalyst basket, the first chamber being adjacent the catalyst basket, the second chamber being adjacent the heat exchanger. Means for conducting process gases from the vessel entrance means through the heat exchanger, the first chamber, the heat exchange tubes in the catalyst basket and the heater to the catalyst basket, and means for conducting product gases from the catalyst basket through the second chamber and the heat exchange tubes in the heat exchanger to the exit means of the vessel.

---

The invention relates to an improved form of ammonia converter, and more particularly to an improved structure between the catalyst basket and heat exchanger in an ammonia converter assembly.

In the usual practice for the synthesis of ammonia, ammonia synthesis gas containing hydrogen and nitrogen in the desired ratio is delivered to an ammonia converter. In its usual form, an ammonia converter comprises an elongated, vertically oriented pressure vessel containing (from top to bottom) a heater, a catalyst basket, and a heat exchanger. Synthesis gas is introduced into the pressure vessel near its top and is caused to travel downwardly between the inside surface of the vessel and the outside surfaces of the housings for the elements mentioned above. Thus, the incoming synthesis gas is used to cool the walls of the pressure vessel. Near the bottom of the vessel, the gas is introduced into the bottom of the heat exchanger where it is caused to pass against a plurality of tubes carrying the downwardly flowing product gas. The synthesis gas is then caused to flow upwardly through a complex baffle assembly located between the heat exchanger and the catalyst basket. The baffle assembly directs the synthesis gas upwardly through catalyst cooling tubes which extend through the catalyst basket. The catalyst cooling tubes lead to a passage which in turn conducts the synthesis gas to the upper portion of the heater means. At this point, the synthesis gas begins to flow through the heating element into the catalyst basket. A conversion of the gas into ammonia is effected during its passage through the catalyst.

When the product gas leaves the catalyst bed, it is caused to enter other portions of the above mentioned baffle assembly by which it is led to a plurality of heat exchanger tubes extending the length of the heat exchanger. At this point, the product gas is collected and passes out of the converter through an outlet at its bottom. The product gas from the converter is cooled by water in a condenser where a large portion of the ammonia production is condensed. Liquid ammonia is separated from the gas in a separator, and flows through let-down tanks for the removal of dissolved gas. The gas recovered in the separator may be recycled through the system.

Heretofore, the joint between the catalyst basket and the heat exchanger, above referred to as the baffle assembly, comprised in general a circular tube sheet serving as a support for the upper ends of the heat exchanger tubes. The upper portion of the baffle assembly was formed by a circular catalyst support plate. The catalyst support plate was affixed to the upper edge of a cylindrical member which may be called the catalyst support plate shell. The lower edge of the shell rested on the tube sheet. Thus, the tube sheet, the shell, and the catalyst support plate defined a cylindrical chamber.

The central portion of the tube sheet was provided with a perforation opening into the heat exchanger. A cylindrical pipe-like member, or heat exchanger outlet piece, was connected to this perforation on the upper surface of the tube sheet. The upper end of the outlet piece connected with the inside portion of a gas distributor. The gas distributor was comprised of two circular plates lying in parallel spaced relationship to each other and to the tube sheet and catalyst support plate. The lower distributor plate was provided with an upwardly extending peripheral flange; and the upper distributor plate was provided with a downwardly extending peripheral flange. Mating surfaces of these flanges were welded together so that the upper and lower distributor plates formed a circular enclosed chamber between them, the upper and lower distributor plates being of a diameter only slightly smaller than the inside diameter of the catalyst support plate shell. Since the upper and lower distributor plates were of considerable size, a plurality of staybolts were provided extending from the upper and lower plates through the chamber they defined. The catalyst cooling tubes extending throughout the length of the catalyst bed, were connected at their lower end to the chamber defined by the upper and lower gas distributing plate. This was made possible by causing the lower ends of the catalyst cooling tubes to pass through the catalyst support plate and the upper gas distributor plate. There was $\frac{1}{16}''$ diametrical clearance between the cooling tubes and the holes in catalyst support. The catalyst support plate was also provided with a plurality of perforations connecting the catalyst bed to the abovementioned chamber formed by the catalyst support plate, the catalyst support plate shell and the tube sheet.

By this construction, synthesis gas flowing upwardly through the heat exchanger entered the heat exchanger outlet piece and flowed into the enclosed chamber defined by the gas distributor plates. From this chamber the gas flowed upwardly through the catalyst cooling tubes to the heater means. Downwardly flowing product gas from the catalyst bed passed through the perforations of the catalyst support plate into the chamber defined by the catalyst support plate, catalyst support plate shell, and tube sheet. The product gas flowed around the gas distributor plates by passing between the peripheral surfaces of these plates and the inside surface of the catalyst support plate shell through flutes provided in the shell. Having reached the lower portion of the chamber, the product gas entered the heat exchanger tubes which were supported by the tube sheet.

The above described structure was complex and costly. It also added to the required length of the ammonia converter. It is therefore a primary purpose of the present invention to provide an improved and simplified joint or baffle assembly between the catalyst bed and the heat exchanger in an ammonia converter.

It is an object of the present invention to provide such an assembly whereby the above mentioned catalyst support plate may be eliminated.

It is an object of the present invention to provide an assembly characterized by a reduced axial dimension.

It is an object of the present invention to provide such an assembly wherein the catalyst support plate and upper gas distributor plate are combined into a single plate.

It is an object of the present invention to provide a new type of staying for the plates.

It is an object of the present invention to provide a joint between the catalyst basket and heat exchanger portions of an ammonia converter wherein fluted gas passages are eliminated.

It is an object of the present invention to provide such a structure wherein increased area is available for catalyst cooling tubes.

These and other objects of the invention which will be described hereinafter, or which will be apparent to one skilled in the art upon reading these specifications, are accomplished by that structure and arrangement of parts of which an exemplary embodiment will now be described. Reference is made to the drawings wherein.

Figure 1:
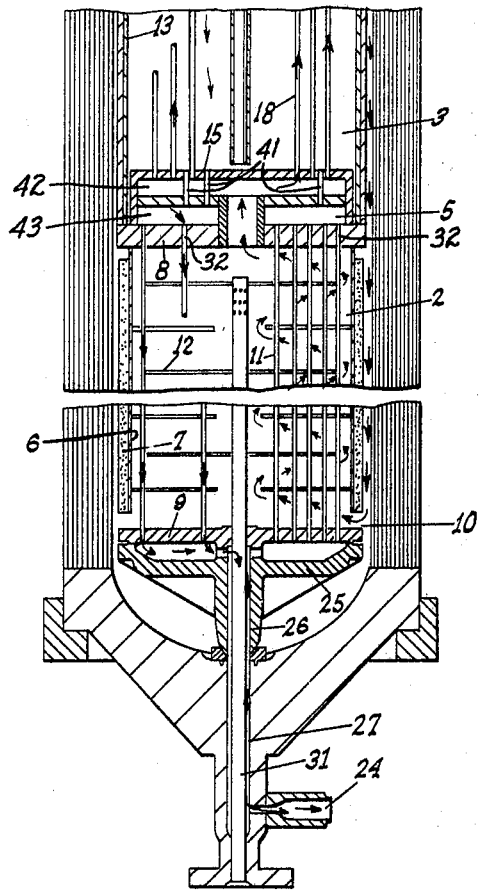
FIGURE 1 is a vertical cross-sectional view of an ammonia converter embodying the present invention.

Referring to FIGURE 1, the ammonia converter comprises an elongated shell 1 housing a heat exchanger generally indicated at 2, a catalyst basket generally indicated at 3, and a heating means generally indicated at 4. The heat exchanger and the catalyst basket are joined by a baffle assembly indicated at 5.

The heat exchanger 2 comprises a cylindrical member having a side wall 6 surrounded by insulative material 7, and surmounted by an upper tube sheet 8. At the bottom of the heat exchanger, a lower tube sheet 9 is provided, but is spaced as at 10 from the side wall 6 to permit passage of gas into the heat exchanger. A plurality of vertically oriented heat exchange tubes 11 pass through and are supported at their bottom ends by the lower tube sheet 9 and at their to ends by the upper tube sheet 8. The interior of the heat exchanger is also provided with a series of horizontally oriented baffles, generally indicated at 12.

The catalyst basket 3 is a cylindrical member having a side wall 13 surrounded by insulative material 14. The lower end of the catalyst basket is provided with a circular plate 15, described more fully hereinafter. The upper portion of the catalyst basket is provided with a tube guide plate 16 having a central perforation 17 therein.

Vertically oriented catalyst cooling tubes 18 extend through and are supported by the plate 15 at their lower ends, and extend through and are supported at their upper ends by the tube guide plate 16.

The heater means 4 (preferably an electrically heated coil) is located above the catalyst basket, is supported on a spider, and is surrounded on its sides and bottom by an enclosure means 20 which connects with the perforation 17 in the tube guide plate 16. The catalyst basket wall 13 and its surrounding insulation 14 extend upwardly past the heater means and are closed off by an electrically insulative plate 21 provided with a layer of heat insulation 22. Terminals for the heating coil can be mounted on the plate 21.

The inlet for the ammonia converter is illustrated at 23 through the shell 1; and the outlet is illustrated at 24 in the bottom closure member of the shell.

The lowermost surface of the lower tube sheet 9 may be provided with a lower tube sheet cover 25 connected about its edges to the tube sheet 9 in a gas-tight fashion. The member 25 is provided with a downwardly extending hollow support 26 connected to a perforation 27 in the shell 1, which in turn leads to the outlet 24.

The ammonia converter may be provided with the traditional control elements, including a pyrometer tube 28 extending into the catalyst bed in a pyrometer tube well 29. External electrical connections for the heater 4 are generally indicated at 30. The converter may also be provided with a bypass tube 31 whereby gas may be caused to enter the converter and pass directly into the baffle assembly 5, having bypassed the heat exchanger 2.

Figure 2:
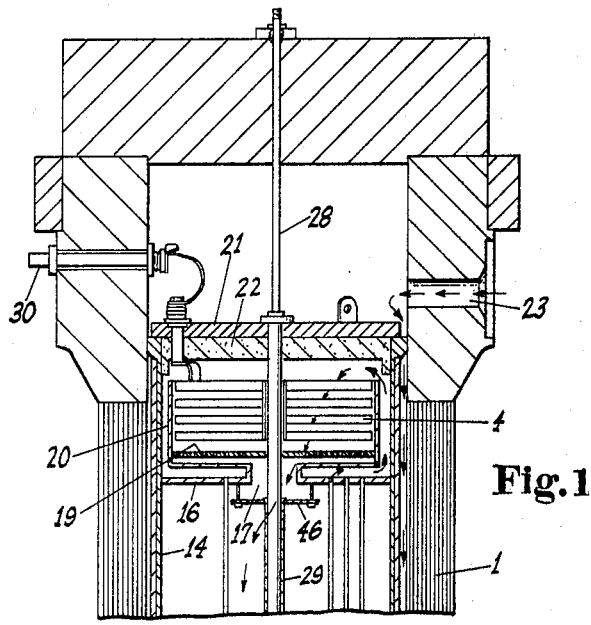
FIGURE 2 is a partial vertical cross-sectional view of an ammonia converter illustrating an improved joint between the catalyst basket and the heat exchanger.

The baffle assembly between the catalyst basket and the heat exchanger is more clearly illustrated in FIGURE 2. Like elements in the figures have been given like index numerals. The lower portion of the baffle assembly comprises the upper tube sheet. It will be understood by one skilled in the art that the tube sheet 8 is circular in configuration, and is provided with a plurality of perforations 32 through which heat exchanger tubes 11 extend in gas-tight fashion. For purposes of clarity of illustration, only one such perforation and heat exchanger tube are illustrated in FIGURE 2.

The upper portion of the baffle assembly comprises the plate 15, which is supported from the tube sheet 8 by means of a cylindrical shell 33. As will be understood, the joint between the upper edge of the shell 33 and the plate 15 is gas-tight, and may be effected in any suitable way including welding or the like. In its preferred form, the plate 15, shell 33 and the tube sheet 8 will be made of stainless steel. The plate 15 is circular in configuration and is provided with a plurality of perforations 34 through which the catalyst coling tubes 18 extend in gas tight fashion. Again, for purposes of clarity, only one such perforation and catalyst cooling tube are illustrated.

Between the plate 15 and the tube sheet 8, a plate 35 of circular configuration is positioned. This plate will preferably be made of stainless steel, with its peripheral surfaces affixed to the shell 33 in gas-tight fashion as by welding. The plate 35 is provided with a central perforation 36. The tube sheet 8 is provided with a perforation 37 which is coaxial with and of the same diameter as the perforation 36 in plate 35. The perforations 36 and 37 are connected in a gas-tight fashion by a heat exchange outlet 38. The heat exchange outlet 38 may be of stainless steel, and may be affixed to the tube sheet 8 and the plate 35 by any suitable gas-tight means including welding or the like.

The plate 15 and the plate 35 are provided with a plurality of pairs of coaxial perforations 39 and 40. The coaxial pairs of perforations are joined by the tubes 41. The upper ends of the tubes 41 are affixed in a gas-tight fashion within the perforations 39 in the plate 15, while the lower ends of the tubes are affixed in a gas-tight fashion within the perforations 40 in the plate 35. For purposes of clarity, only three of the tubes 41 are illustrated in FIGURE 2.

In the baffle assembly of the present invention, it will be noted that two circular chambers are formed. The first chamber generally indicated at 42, is formed by the plate 15, the plate 35 and the shell 33. The second circular chamber generally indicated at 43, is formed by the tube sheet 8, the plate 35 and the shell 33. The chamber 42 serves as a synthesis gas distributing chamber, whereby synthesis gas from the heat exchanger, passing through the heat exchanger outlet 38, enters the chamber 42 and is caused to flow upwardly into the catalyst cooling tubes in the catalyst bed within the catalyst basket. It will be noted that the plate 15 not only serves as the cover for the distributing chamber 42, but also as the support for the catalyst in the catalyst basket. Gas flowing upwardly through the catalyst cooling tubes may be increased in velocity by the insertion of rods (preferably of square or other non-circular cross-section) in the catalyst tubes. One such rod is illustrated at 44.

The second chamber 43 serves as a distributing chamber for the product gas, product gas from the catalyst basket enters the chamber 43 and bypasses the chamber 42 by means of the tubes 41. To insure that none of the catalyst itself falls through or clogs the tubes 41, the upper surface of the plate 15 may be provided with a catalyst support screen generally indicated at 45. Upon entering the chamber 43, the product gas will flow downwardly through the heat exchanger tubes 11. It will be seen from this construction that the tubes 41 not only serve as passages for gas from the catalyst basket to the chamber 43, but also serve as stays between the plate 15 and the plate 35.

Briefly in the operation of the ammonia converter, synthesis gas enters the converter shell 1 through the inlet 23. The synthesis gas flows downwardly in the annular space between the shell 1 and the catalyst basket wall 13 and its insulation 14. Continuing its travel, the gas flows downwardly between the shell 1 and the wall 6 and insulation 7 of the heat exchanger. When the synthesis gas reaches the annular opening 10 in the heat exchanger, it is caused to enter the heat exchanger and flow upwardly about the heat exchange tubes 11 and around the baffles 12. This upwardly flowing synthesis gas enters the chamber 42 through the heat exchanger outlet 38 and flows upwardly therefrom into the catalyst cooling tubes 18. At the upper end of the catalyst cooling tubes, the synthesis gas is caused to flow in the annular passage defined by the tube guide plate 16, the extension of the catalyst basket wall 13 and the member 20 surrounding the heating means. When the gas reaches the upper portion of the converter enclosed by the plate 21 with its insulation 22, it begins its downward flow first passing through the heating means 4. This heating means 4 when energized raises the gas to the reaction temperature. The down-flowing gas next passes through the spider 19 and the perforation 17 in the tube guide plate 16, entering the catalyst basket. A baffle 46 may be provided to aid in dispersing the gas throughout the catalyst bed. As the gas passes through the catalyst (not shown) an exothermic reaction takes place; but the temperature in the catalyst bed is controlled by the cooler synthesis gas passing upwardly through the catalyst cooling tubes. Having passed through the catalyst bed, the product gas enters the chamber 43 in the baffle assembly 5 by means of the tubes 41. From the chamber 43, the product gas flows downwardly through the heat exchanger tubes 11. A heat exchange occurs between the gas flowing through these tubes and the up-flowing synthesis gas passing through the heat exchanger about the tubes. At the lower end of the heat exchanger tubes, the gas is directed by the lower tube sheet cover 25 through its hollow support 26 to the perforation 27 in the converter shell 1, and thence to the outlet 24.

As will be understood by one skilled in the art, additional temperature control within the converter can be effected by allowing additional synthesis gas to enter the converter through the bypass tube 31. Since the gas entering the converter in this way bypasses the heat exchange section, the temperature of the gas passing through the catalyst cooling tubes is reduced. Thus, control of the maximum temperature in the catalyst bed may be accomplished.

The embodiments of the invention in which an exclusive property or privilege is claimed are defined as follows:

1. A converter for the synthesis of ammonia and the like comprising an elongated pressure vessel, closure means at the top and bottom ends of said pressure vessel, entrance means at the top end of said pressure vessel for process gases for conversion to ammonia, outlet means at the bottom end of said pressure vessel for ammonia-bearing gases, first and second elongated casings and first and second tube sheets within said pressure vessel, the bottom end of said first casing being affixed in gas-tight fashion to the periphery of the upper surface of said first tube sheet, the top end of said second casing being affixed in gas-tight fashion to the periphery of the lower surface of said first tube sheet, the top end of said first casing being located adjacent said inlet means, a closure means for said top end of said first casing, the bottom end of said second casing being open and extending toward said outlet means, said second tube sheet being located below said open end of said second casing in spaced relationship thereto, a catalyst support plate located in said first casing in spaced relationship to said upper surface of said first tube sheet, an annular shell peripherally connecting in gas-tight fashion said catalyst support plate to said upper surface of said first tube sheet, a tube guide plate located within said first casing above said catalyst support plate and spaced downwardly from said closure means for the top end of said first casing, the space defined by said first casing, said tube guide plate and said catalyst support plate comprising a catalyst basket, said space defined by said second casing and said first and second tube sheets comprising a heat exchanger, a partition plate located between said catalyst support plate and said first tube sheet and fixed about its periphery to said annular shell whereby to form a first and second chamber only between said catalyst basket and said heat exchanger, said first chamber comprising the space defined by said catalyst support plate, said partition plate and said annular shell, said second chamber comprising the space defined by said partition plate, said first tube sheet and said annular shell, said first and second casings and said first tube sheet comprising an elongated structure having a lesser external diameter than the internal diameter of said pressure vessel so as to form an annular passageway for said process gases from said entrance means to said space between said open bottom end of said second casing and said second tube sheet through which said process gases may enter said heat exchanger, conduit means for conducting said process gases directly from said heat exchanger to said first chamber, said conduit means extending between and through said partition plate and said first tube sheet in gas-tight fashion, a first plurality of heat exchange tubes for conducting said process gases directly from said first chamber to said space between said tube guide plate and said top closure for said first casing, said first plurality of heat exchange tubes being located in said catalyst basket and extending between and through said catalyst support plate and said tube guide plate in gas-tight fashion, said tube guide plate having a central opening for the passage of said process gases from said last mentioned space into said catalyst basket, means for conducting said ammonia-bearing gases directly from said catalyst basket to said second chamber in heat exchange relationship with said process gases in said first chamber and a second plurality of heat exchange tubes for passing said ammonia-bearing gases from said second chamber to said outlet means, said second plurality of heat exchange tubes being located in said heat exchanger and extending between and through said first and second tube sheets in gas-tight fashion.

2. The structure claimed in claim 1 including a heating means located in said space between said tube guide plate and said closure means for the top end of said first elongated casing.

3. The structure claimed in claim 1, wherein said last mentioned means comprises an outlet plate spaced from but joined peripherally to said second tube sheet, said outlet plate having a central hollow extension contacting and joined to the closure means for said vessel, said closure means having a central perforation connected to said outlet means.

4. The structure claimed in claim 3 wherein a tube extends from the exterior of said vessel through the perforation in said closure means to a point adjacent said first tube sheet whereby a portion of the process gases may be introduced into said converter without passing around said second plurality of heat exchange tubes.

5. The structure claimed in claim 1 wherein said means for conducting ammonia-bearing gases from said catalyst basket to said second chamber comprises a plurality of tubes passing from said catalyst support plate to said partition plate, said tubes extending through coaxial perforations in said partition plate and said catalyst support plate in gas-tight fashion.

6. The structure claimed in claim 5 wherein a plurality of baffles is located between said first tube sheet and said second tube sheet to direct the flow of process gases about said second plurality of heat exchange tubes.

7. The structure claimed in claim 6 including a wire mesh screen element overlying said catalyst support plate.

References Cited

UNITED STATES PATENTS

| | | | |
|---|---|---|---|
| 1,909,378 | 5/1933 | Richardson | 23—289 X |
| 3,041,151 | 6/1962 | Christensen | 23—289 |

JOSEPH SCOVRONEK, Primary Examiner